United States Patent
Urano et al.

(10) Patent No.: US 8,314,610 B2
(45) Date of Patent: Nov. 20, 2012

(54) RESOLVER FOR DETECTING A ROTATIONAL POSITION OF A RESOLVER ROTOR CONNECTED TO A ROTATOR SHAFT OF A ROTATING MACHINE

(75) Inventors: Hiroaki Urano, Miyoshi (JP); Masayuki Nishiguchi, Toyota (JP); Hiroki Keino, Toyota (JP); Mutsumi Matsuura, Fukuroi (JP); Yuki Yamakawa, Miyoshi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 340 days.

(21) Appl. No.: 12/681,689

(22) PCT Filed: Apr. 23, 2009

(86) PCT No.: PCT/JP2009/058082
§ 371 (c)(1),
(2), (4) Date: Apr. 5, 2010

(87) PCT Pub. No.: WO2009/142093
PCT Pub. Date: Nov. 26, 2009

(65) Prior Publication Data
US 2010/0219816 A1    Sep. 2, 2010

(30) Foreign Application Priority Data
May 20, 2008  (JP) .................. 2008-131778

(51) Int. Cl.
*G01B 7/30*    (2006.01)
(52) U.S. Cl. ............................ 324/207.25; 324/207.11
(58) Field of Classification Search .................. None
See application file for complete search history.

(56) References Cited

U.S. PATENT DOCUMENTS 8,148,973 B2 * 4/2012 Nishiguchi et al. ...... 324/207.25
2007/0247791 A1 10/2007 Chen et al.
(Continued)

FOREIGN PATENT DOCUMENTS

CN    2519469 Y    10/2002
(Continued)

OTHER PUBLICATIONS

International Search Report issued in Application No. PCT/JP2009/058082; Mailed on Jun. 2, 2009 (With Translation).

(Continued)

*Primary Examiner* — Vinh Nguyen
(74) *Attorney, Agent, or Firm* — Oliff & Berridge, PLC (57) ABSTRACT

A resolver is provided with a rotor plate fitted to a key groove in a rotating shaft and connected to the rotating shaft, and also with a resolver stator for detecting the rotational position of the rotor plate. The resolver stator is provided with a resolver cover for protecting a coil board of a stator core and fixed to the stator core. The coil board is provided with holes fitted to stator pins which are projections of the stator core, coil patterns each formed so as to center on each of the holes, and lead wires connected to the coil patterns formed on the coil board. The outer peripheral portion of the stator core is provided with long mounting holes for fixing the resolver to the housing of a rotating machine, such as an electric motor or a generator, and also with engaging holes engaging with claws of the resolver cover.

4 Claims, 6 Drawing Sheets

U.S. PATENT DOCUMENTS

2009/0289622 A1* 11/2009 Kikuchi et al. .......... 324/207.25
2010/0156401 A1* 6/2010 Nishiguchi et al. ...... 324/207.25

FOREIGN PATENT DOCUMENTS

| CN | 2919338 Y | 7/2007 |
|---|---|---|
| JP | A-08-152440 | 6/1996 |
| JP | A-2007-171131 | 7/2007 |
| JP | A-2007-192640 | 8/2007 |
| JP | A-2007-285774 | 11/2007 |
| JP | A-2007-333573 | 12/2007 |
| WO | WO 2007/074375 A2 | 7/2007 |
| WO | WO 2007/119142 A1 | 10/2007 |

OTHER PUBLICATIONS

Chinese Office Action issued in Application No. 200980116809.8; Dated Jan. 31, 2012 (With Translation).

* cited by examiner

RESOLVER FOR DETECTING A ROTATIONAL POSITION OF A RESOLVER ROTOR CONNECTED TO A ROTATOR SHAFT OF A ROTATING MACHINE

TECHNICAL FIELD

The present invention relates to a resolver, and more particularly to a resolver having an annular resolver stator for detecting a rotational position of a resolver rotor connected to a rotating shaft of a rotating machine, and a resolver cover for protecting an annular coil board provided at the resolver stator.

BACKGROUND ART

Generally in rotating machines, such as an electric motor, and a generator, rotation sensors using a Hall IC, a resolver and the like for detecting the rotational positions of rotational shafts are provided. Especially in hybrid powered vehicles, fuel cell powered vehicles, electric vehicles and the like intended for use in severe environments, resolvers of simple structure highly compatible to their environment are used, and control of the rotating machines is performed in accordance with the detected rotational position information.

A typical resolver for detecting a rotational position includes a resolver stator having an exciting coil for exciting a resolver rotor, a first detecting coil and a second detecting coil, and a resolver rotor connected to a rotating shaft.

Because the rotational position detection precision of the resolver is influenced by the patterns of windings of the first detecting coil and the second detecting coil, wire is wound precisely so as to be achieve a necessary measurement precision, and it is necessary to prevent this state from being disturbed by external force or the subsequent operation and the like. Therefore, care has to be taken on handling of it.

Japanese Patent Laid-Open Publication No. 2007-171131 (Patent Document 1) and Japanese Patent Laid-Open Publication No. 2007-192640 (Patent Document 2) each disclose art in which, in consideration of the above-noted factors, the area of the side surface of a resolver rotor extending in a diameter direction is configured to change with a change in the rotational position instead of the structure of winding a wire on a projected core opposed in the diameter direction to the resolver rotor from a resolver stator, and an annular coil board with an exciting coil, a first detecting coil and a second detecting coil being formed on the board as a coil pattern is used, whereby windings are formed precisely and reduction in thickness of a resolver main body is realized.

PRIOR ART DOCUMENT

Patent Documents

Patent Document 1: Japanese Patent Laid-Open Publication No. 2007-171131
Patent Document 2: Japanese Patent Laid-Open Publication No. 2007-192640

DISCLOSURE OF THE INVENTION

Problems to be Solved by the Invention

In the art described in each of the aforementioned documents, an annular coil board is stacked on a base plate having a projected core, and the stacked annular coil board is held in such a manner as to be fixed to a base plate by a plurality of holding claws provided at a cover from the outer peripheral portion. By adopting such a shape, assembly with high precision is realized without adjustment after assembly.

However, when fixing is provided by a plurality of holding claws provided on the cover, lifting of portions which are not held due to expansion and shrinkage by temperature change occurs, the coil board outer peripheral ends are not protected, and only the function as the cover on the resolver rotor side is performed.

Thus, it is an advantage of a resolver cover of a resolver according to the present invention to realize protection of a side at a resolver rotor and an outer peripheral end of the coil board by being compatible with expansion and shrinkage by temperature change without increasing the number of components.

Means for Solving the Problems

In order to attain the advantage noted above, the present invention is provides a resolver having an annular resolver stator for detecting a rotational position of a resolver rotor connected to a rotating shaft of a rotating machine, and a resolver cover for protecting an annular coil board provided at the resolver stator, wherein the resolver stator has a stator core forming a magnetic field of the coil board and having a plurality of projections fitted to the coil board, and a fixing section provided with a plurality of engaging holes for fixing the resolver cover and which is provided at an outer peripheral portion of the stator core to fix the resolver stator to a housing of the rotating machine, and the resolver cover has a plurality of arms formed to cover the coil board and which extend in an outer periphery direction, and a claw provided at a tip end of each of the arms and which engages with the engaging hole of the resolver stator.

Further, in the resolver according to the present invention, it is preferable that the claws provided at the arms of the resolver cover engage with an inner peripheral side of the engaging hole of the resolver stator to fix the position of the coil board.

Further, in the resolver according to the present invention, it is preferable the coil board is fitted to the resolver stator having a plurality of projections, a groove is provided at an outer periphery of an end portion of each of the projections of the resolver stator projected from the coil board, through-holes fitted to the projections are provided in the resolver cover, claws provided at the through-holes of the resolver cover engage with the grooves of the projections, to thereby fix the position of the coil board.

Further, in a resolver according to the present invention having an annular resolver stator for detecting a rotational position of a resolver rotor connected to a rotating shaft of a rotating machine and a resolver cover for protecting an annular coil board provided on the resolver stator, the resolver stator has a stator core forming a magnetic field of the coil board and having a plurality of projections fitted to the coil board and provided with grooves on outer peripheries of end portions, and a fixing section provided at an outer peripheral portion of the stator core to fix the resolver stator to a housing of the rotating machine, and the resolver cover is provided with though-holes fitted to projections of the resolver stator, and a claw provided at each of the through-holes of the resolver cover engages with the groove of each of the projections, whereby the position of the coil board is fixed.

Advantage of the Invention

By employing the present invention, it is possible to realize a resolver compatible with expansion and shrinkage resulting from temperature change, and can protect the side at the resolver rotor and the outer peripheral end of the coil board without increasing the number of components is provided.

BEST MODE FOR CARRYING OUT THE INVENTION

Hereinafter, the best mode (hereinafter, called an embodiment) for carrying out the present invention will be described with reference to the drawings.

Figure 1:
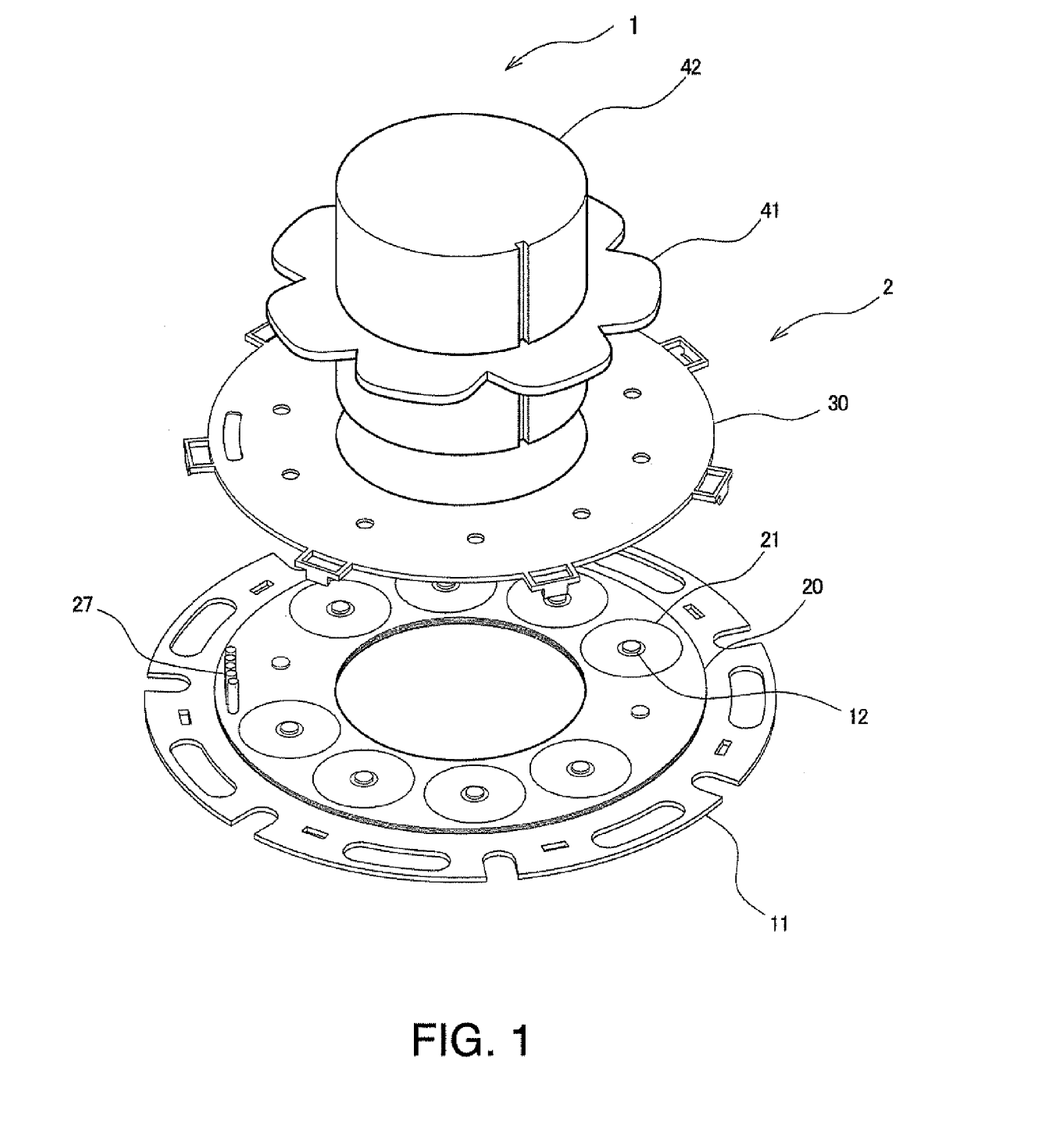
FIG. 1 is a schematic configuration view showing a configuration of a resolver according to an embodiment of the present invention.

FIG. 1 shows a configuration of a resolver 1. The resolver 1 has a rotor plate 41 fitted to a key groove of a rotating shaft 42 and connected to the rotating shaft 42, and a resolver stator 2 for detecting a rotational position of the rotor plate 41. The resolver stator 2 includes a resolver cover 30 for protecting a coil board 20 on a top surface of a stator core 11 and fixes the coil board 20 to the stator core 11, and the rotor plate 41 and the stator core 11 are formed by multilayered bodies of electromagnetic steel plates. When the exciting frequency is small, ordinary steel plates may be adopted as the material of the rotor plate 41 and the stator core 11 instead of electromagnetic plates.

The coil board 20 is provided with holes fitted to stator pins 12 which project from the stator core 11, coil patterns 21 each formed so as to center on the respective holes, and lead wires 27 connected to the coil patters formed on the coil board 20.

Figure 2:
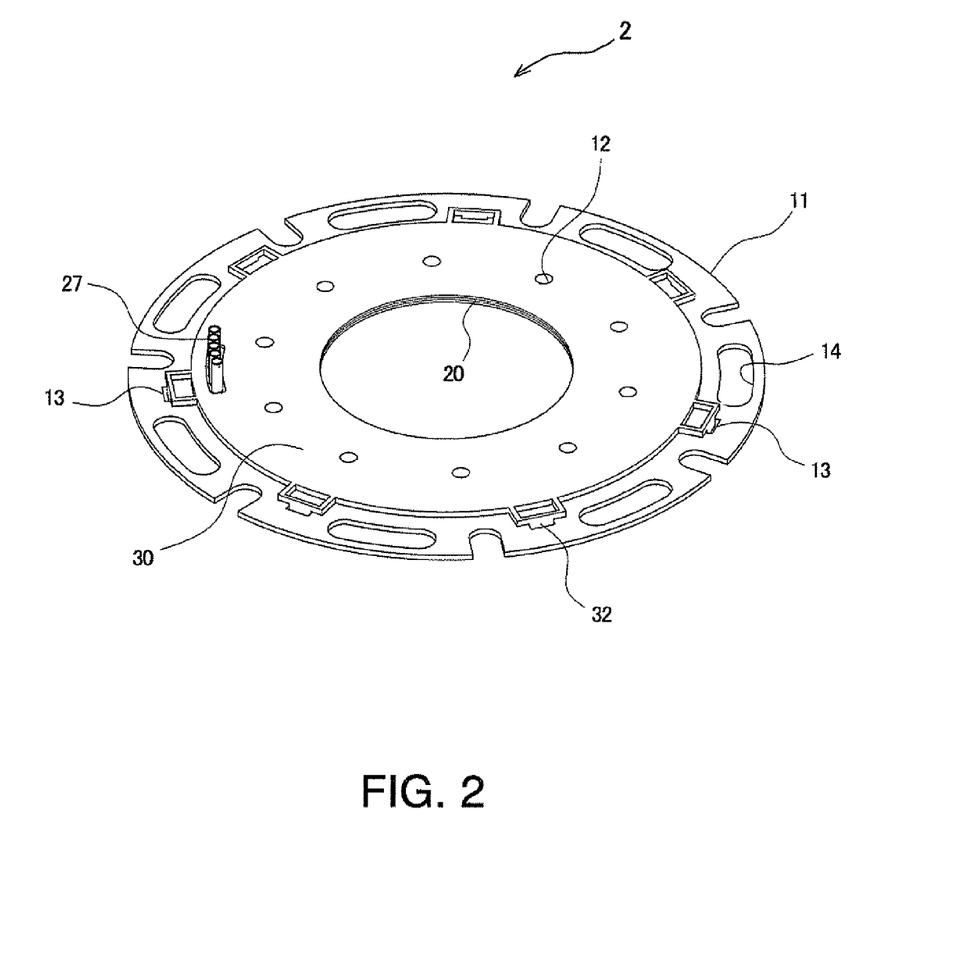
FIG. 2 is an external view showing a resolver stator according to the embodiment of the present invention.

FIG. 2 is a view showing the appearance of the resolver stator 2. The resolver cover 30 protects the coil board 20 which overlays the rotor plate, and fixes the coil board 20 disposed on the stator core 11 by snap fits 32 which are claws of an outer peripheral portion being engaged with engaging holes 13. The resolver cover 30 covers a top surface and an outer peripheral end portion of the coil board 20 and protects the coil board 20, while the outer peripheral portion of the stator core 11 is provided with long mounting holes 14 to be fixed to a housing of a rotating machine, such as an electric motor or a generator, and also with engaging holes 13 engaging with claws of the resolver cover 30.

Figure 3:
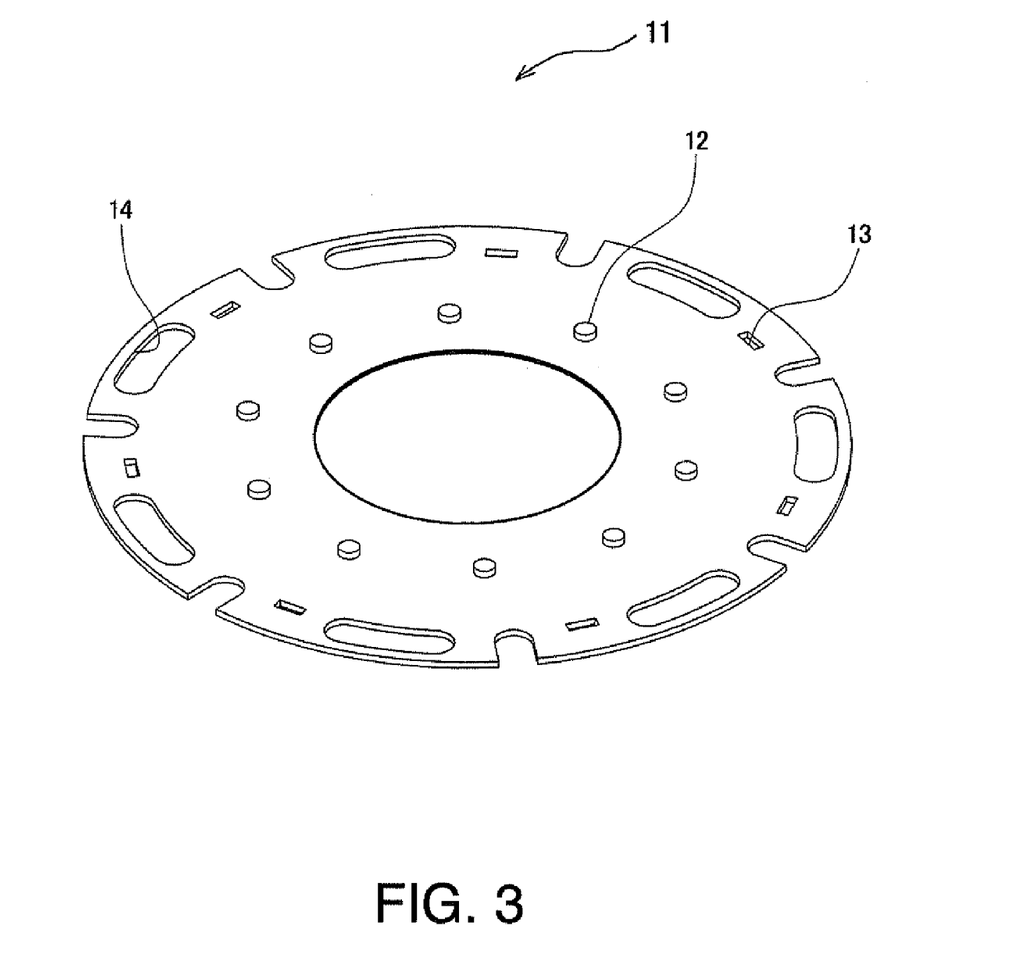
FIG. 3 is an external view showing a stator core according to the embodiment of the present invention.

FIG. 3 shows the stator core 11 which has a plurality of stator pins 12 on an inner peripheral portion, and a plurality of engaging holes 13 and mounting holes 14 provided on the outer peripheral portion. The stator pins 12 are press-fitted onto stator core 11 after the holes for the stator pins, and at the same time the engaging holes 13 and the mounting holes 14 are worked by press-fitting. One characteristic of the present embodiment is the elimination of wasted space by providing the engaging holes 13 for the resolver cover and the mounting holes 14 of the resolver stator in the outer peripheral portion of the stator core 11.

Figure 4:
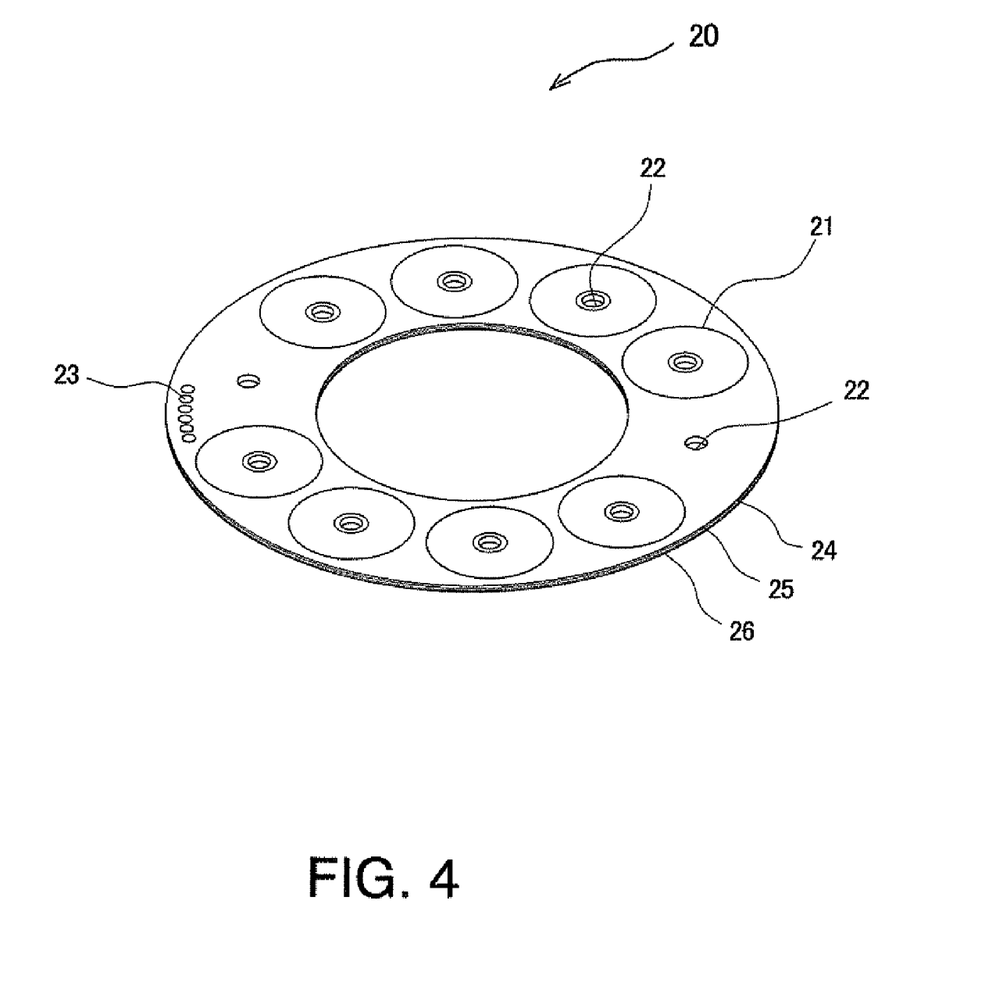
FIG. 4 is an external view showing a coil board according to the embodiment of the present invention.

FIG. 4 shows the coil board 20. The coil board 20 has a three-layer structure comprising an exciting coil board 24, a coil board 25 for a cosine phase which is a first detecting coil, and a coil board 26 for a sine phase which is a second detecting coil, and the respective coils are provided so as to center on a plurality of through-holes 22 fitted to the stator pins 12. The respective coils are wired to the terminal 23.

Figure 5:
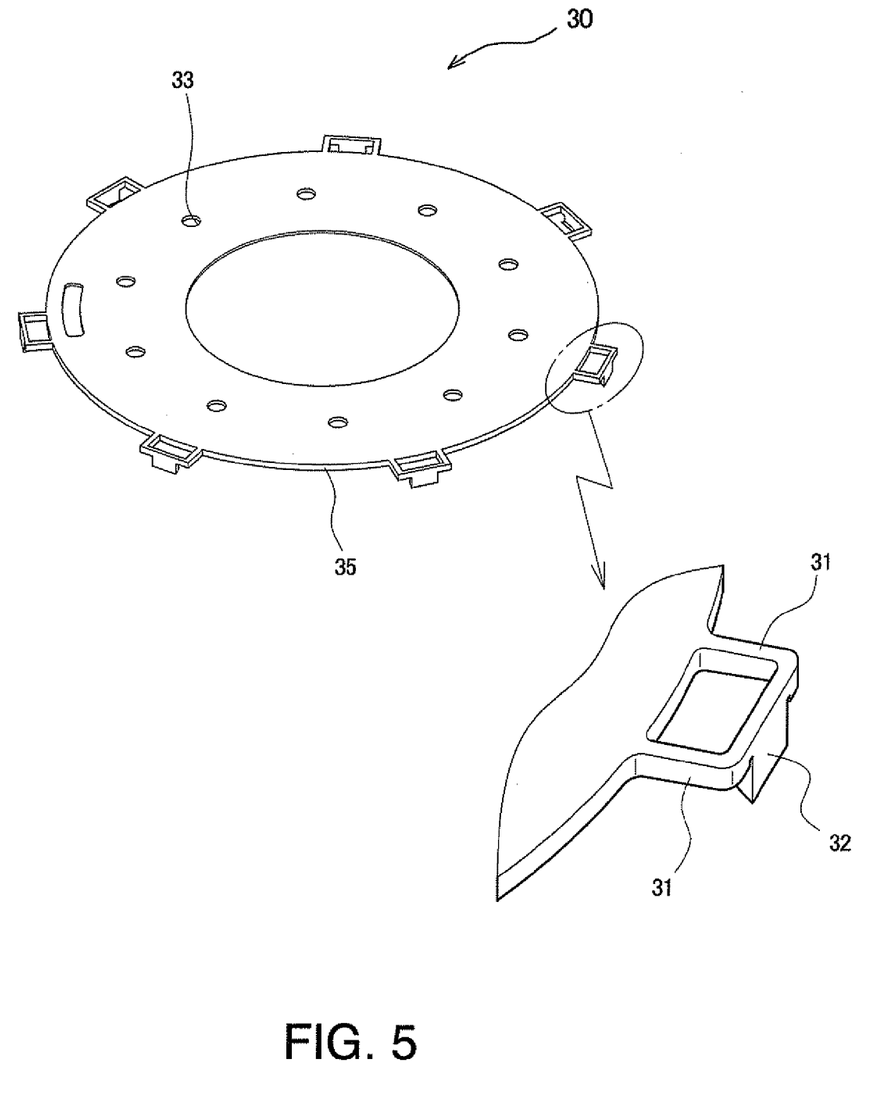
FIG. 5 is an external view showing a resolver cover according to the embodiment of the present invention.

FIG. 5 shows the resolver cover 30 and an enlarged view of a snap fit 32 at its outer peripheral portion. The resolver cover 30 is provided with through-holes where end surfaces of the stator pins 12 are exposed and snap fits 33 for pins which engage with the stator pins 12 on an inner peripheral portion, and the snap fits 32 which engage with the resolver stator 2 on an outer peripheral portion.

One characteristic of the present embodiment is the provision of the snap arms 31 at the outer peripheral portion of the resolver cover 30, and the snap fits 32 at tip end portions of the snap arms 31. By employing such a configuration, the resolver cover 30 is brought into close contact with the resolver stator by catch of the snap fits 32 using deflection of the snap arms 31. The snap fits 33 for pins enhance close adherence in addition to fixing the components.

Figure 6:
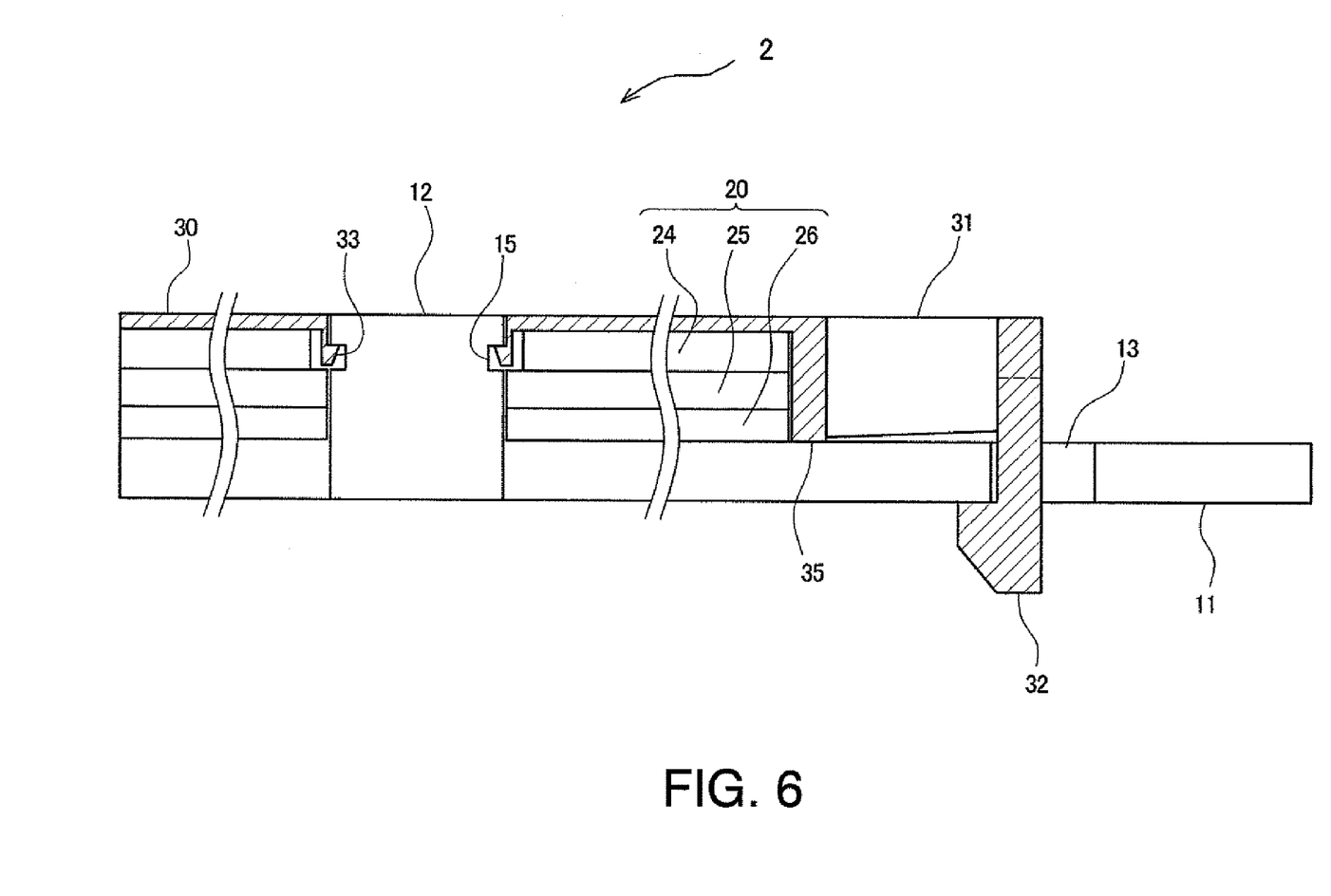
FIG. 6 is an explanatory view for explaining a sectional structure of a resolver stator of the present invention.

FIG. 6 shows a sectional structure of the resolver stator 2, and will be used to described the structure of the resolver stator 2. The resolver stator 2 is comprised by the stator core 11, the coil board 20 and the resolver cover 30. A groove 15 is provided at an outer periphery of an end portion of the stator pin 12, which is press-fitted into the stator core 11. The coil board 20 is disposed on a top surface of the stator core 11 so as to be fitted to the stator pin 12. The coil board 20 has a three-layer structure comprising the exciting coil board 24, the coil board 25 for a cosine phase and the coil board 26 for a sine phase in sequence from the top. The exciting coil board 24 is provided with notches for smoothly mounting the snap fit 33 for a pin.

The resolver cover 30 is disposed so as to cover the coil board 20. The resolver cover 30 comprises the snap fits 33 for pins engaging with the stator pins 12, an outer peripheral wall 35 which is in contact with an outer peripheral portion of the coil board 26, the snap arms 31 extending in the outer peripheral method from the outer peripheral wall 35, and the snap fit 32s provided at the tip end of the snap arms 31.

The outer peripheral wall 35 of the resolver cover 30 acts on a snap fit 32 as a support point when the snap fit 32 is inserted into the engaging hole 13 of the stator core 11 and the snap fit 32 is engaged with the stator core 11 by the deflection of the snap arm 31 while the outer peripheral wall 35 is brought into close contact with the stator core 11 by the reaction force, such that the coil board 20 is fixed to the stator core 11.

As described above, by employing the present embodiment, a resolver 1 which is able to deal with expansion and shrinkage caused by temperature changes and capable of protecting the side at the resolver rotor and the outer peripheral end of the coil board can be realized without increasing the number of components. It should be noted that although in the present embodiment both the snap fits 32 at the outer peripheral portion and the snap fits 33 for pins engaging with the stator pins 12 on the inner peripheral portion are provided, the coil board 20 may be fixed by using just one of these two types of fits. When only the snap fits 33 for pins on the inner peripheral portion are used, the snap arms 31 at the outer peripheral portion, the snap fits 32 and the engaging holes 13 of the stator core 11 are not needed. Similarly, when only the snap fits 33 for pins on the outer peripheral portion are used, it is obvious that the snap fits 33 on the inner peripheral portion and the grooves 15 provided at the stator pins 12 are not needed. Further, when it is not necessary to provide grooves in the stator pins 12, the projection portions of the stator pins 12 can be integrally formed during pressing of the stator core 11.

INDUSTRIAL APPLICABILITY

The resolver according to the present invention is compatible with expansion and shrinkage by temperature change, capable protecting the side at the resolver rotor and the outer peripheral end of the coil board without increasing the number of components, and can be used for a hybrid powered vehicle, a fuel cell powered vehicle, an electric vehicle and the like.

DESCRIPTION OF SYMOBLS

1 RESOLVER, 2 RESOLVER STATOR, 11 STATOR CORE, 12 STATOR PIN, 13 ENGAGING HOLE, 14 MOUNTING HOLE, 15 GROOVE, 20 COIL BOARD, 21 COIL PATTERN, 22 THROUGH-HOLE, 23 TERMINAL, 24 EXCITING COIL BOARD, 25 COIL BOARD FOR COSINE PHASE, 26 COIL BOARD FOR SINE PHASE, 27 LEAD WIRE, 30 RESOLVER COVER, 31 SNAP ARM, 32 SNAP FIT, 33 SNAP FIT FOR PIN, 35 OUTER PERIPHERAL WALL, 41 ROTOR PLATE, 42 ROTATING SHAFT

The invention claimed is:

1. A resolver having an annular resolver stator for detecting a rotational position of a resolver rotor connected to a rotating shaft of a rotating machine, and a resolver cover for protecting an annular coil board provided at the resolver stator,
wherein the resolver stator comprises:
a stator core forming a magnetic field of the coil board and having a plurality of projections fitted to the coil board, and
a fixing section provided with a plurality of engaging holes for fixing the resolver cover and which is provided at an outer peripheral portion of the stator core to fix the resolver stator to a housing of the rotating machine; and
wherein the resolver comprises:
a plurality of arms formed to cover the coil board and which extend in an outer periphery direction,
a claw provided at a tip end of each of the arms and which engages with the engaging hole of the resolver stator, and
a plurality of through-holes fitted to a plurality of projections provided on the resolver stator, and claws provided at the through-holes.

2. The resolver according to claim 1,
wherein the claw provided at the arm of the resolver cover is engaged with an inner peripheral side of the engaging hole of the resolver stator, and thereby, the coil board is fixed.

3. The resolver according to claim 2,
wherein the coil board is fitted to the resolver stator having the plurality of projections, a groove is provided at an outer periphery of an end portion of each of the projections of the resolver stator projected from the coil board, the plurality of through-holes fitted to the projections are provided in the resolver cover, claws provided at the through-holes of the resolver cover engage with the grooves of the projections, and thereby, the coil board is fixed.

4. A resolver having an annular resolver stator for detecting a rotational position of a resolver rotor connected to a rotating shaft of a rotating machine, and a resolver cover for protecting an annular coil board provided on the resolver stator,
wherein the resolver stator comprises:
a stator core forming a magnetic field of the coil board and having a plurality of projections fitted to the coil board and provided with grooves on outer peripheries of end portions, and
a fixing section provided at an outer peripheral portion of the stator core to fix the resolver stator to a housing of the rotating machine; and
wherein the resolver cover comprises a plurality of though-holes fitted to a plurality of projections of the resolver stator, and a claw provided at each of the through-holes of the resolver cover engages with the groove of each of the projections, and the claw provided at an arm of the resolver cover engages with an inner peripheral side of an engaging hole of the resolver stator, whereby the coil board is fixed.

* * * * *